W. G. SHELTON.
AUTOMATIC ELECTRIC SWITCH.
APPLICATION FILED MAR. 17, 1916.

1,425,610.

Patented Aug. 15, 1922.

WITNESSES:
René Bruine
J. L. Wallace

INVENTOR
William Gentry Shelton
By Attorneys,
Fraser Turk & Myers

UNITED STATES PATENT OFFICE.

WILLIAM GENTRY SHELTON, OF NEW YORK, N. Y.

AUTOMATIC ELECTRIC SWITCH.

1,425,610.  Specification of Letters Patent.  Patented Aug. 15, 1922.

Application filed March 17, 1916. Serial No. 84,869.

*To all whom it may concern:*

Be it known that I, WILLIAM GENTRY SHELTON, a citizen of the United States of America, residing in the borough of Manhattan, city, county, and State of New York, have invented certain new and useful Improvements in Automatic Electric Switches, of which the following is a specification.

One of the objects of this invention is to provide means for opening the circuit of an electric motor upon the motor being stalled, the circuit opening means remaining in perfect operative order and capable upon proper movement of the rotary part of the motor of automatically closing the motor circuit and maintaining the same closed until the motor is again stalled or the speed of the rotary element slowed down below a predetermined minimum. Another object of the invention is to provide an electric switch capable of automatically closing the motor circuit upon the rotation of the rotary element of the motor and of opening the motor circuit upon the cessation of such rotation or upon the speed falling below a predetermined minimum.

In the preferred embodiment of the invention the switch is controlled by a speed governor device, either a specially constructed governor exclusively for actuating the switch or the ordinary governor of the associated apparatus.

This switch is particularly useful in connection with independent motors for driving various mechanisms as for instance a motor for driving a phonograph record disk, and is particularly designed to open the motor circuit when the rotation of a record disk, or its supporting platen is stopped or slowed down.

My invention may best be understood by reference to the accompanying drawings, wherein,—

Figure 1:
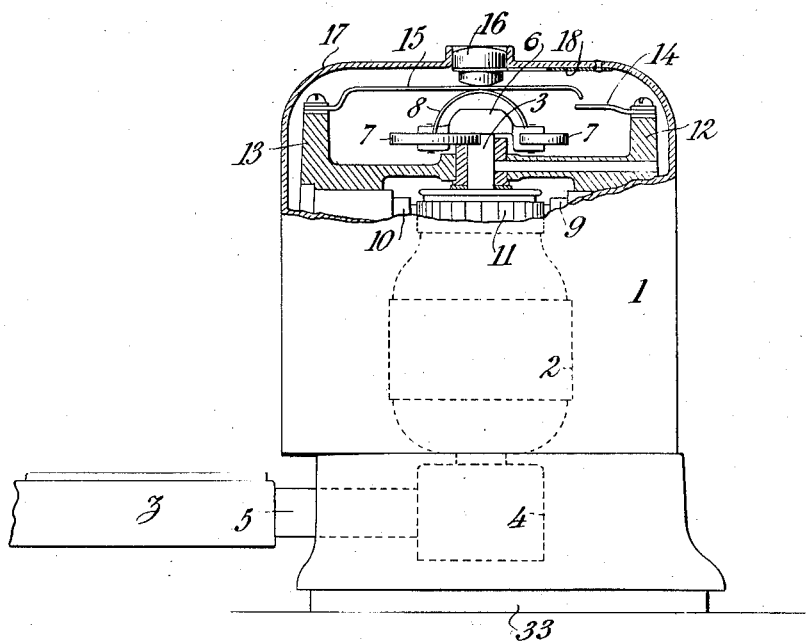
Figure 1 is an elevation partly in central section illustrating one practicable embodiment of my invention showing the same applied to an independent talking machine motor.

In the illustrated embodiment of the invention 1 designates a motor casing. This motor is illustrative of the type of independent talking machine motor wherein the rotating element 2 of the motor is provided with a vertically disposed shaft 3, having upon it a friction driving wheel 4 in surface engagement with a delivery driving wheel 5 adapted to engage the periphery of the platen of a talking machine motor and drive this forwardly independently of the motive mechanism of the phonograph motor, but nevertheless under the control of the governor mechanism of such motor.

In the preferred installation, a normally open electric switch is placed in the motor circuit. In certain embodiments of the invention, it is preferable to have a switch which is held in its open position when the parts are at rest, and which automatically assumes a closed position upon the attainment of sufficient motor speed to assure the proper running of the mechanism. The mechanism shown in Figs. 1 and 2 embodies these structural features. A hub 6 is shown fast on the motor spindle 3, to which hub are pivotally mounted a pair of weights 7, adapted to swing outwardly on a plane radially to the axis of rotation of the shaft, on the attainment of proper speed. Suitable back-stops are provided to limit the outward centrifugal motion of these weights, which, by inspection will readily be seen to correspond to the weights or balls of a ball governor. The weights are shown connected by an arch spring 8. This spring serves two functions, one of controlling the electric switch, the other of drawing the weights inwardly at the cessation of rotation, and against the action of which the weights expand.

The frame of the machine is shown provided with a pair of brushes 9 and 10 running upon a conventional form of commutator ring 11. A pair of posts 12 and 13 are shown located adjacent the governor portions of the mechanism. These posts are shown carrying contact or switch members 14 and 15 which are assumed to be in circuit, respectively, with the motor spindle 3 and the brushes 9 and 10.

In the illustration, the switch member 14 is short, relatively to the other member 15 which is of resilient nature and extends across the top of the arch 8. The parts are so proportioned that when the arch is in its normal or idle position, namely, the position illustrated in Fig. 1, it holds the switch member 15 out of engagement with the switch member 14, thereby maintaining the circuit open. Whether or not the circuit will be closed upon a speed less than the maximum motor speed, is governed by the normal space between the contact points of the members 14 and 15. This space may be so adjusted that the circuit will be closed during some predetermined ranges of speed, or so that it will only be closed during the maximum motor speed.

The closing of course is effected by the outward movement of the weights flattening the arch 8, whereupon the circuit is automatically closed. Further outward movement of the weights further flattens the arch to such an extent that there is no frictional engagement between the arch spring 8 and the switch member.

The circuit may be closed either by rotating the driven part, as for instance the phonograph record platen by hand, or by means of a push button 16 shown located in the upper portion 17 of the housing and directly above the switch member 15 and the crown of the arch 8. The push button is adapted to be returned to its normal position by means of a suitable leaf-spring 18. When it is desired to immediately and positively close the switch by means of the push button, this is depressed, depressing the switch member 15 until it engages the switch member 14. Of course, this depression of the member 15 flattens the arch 8, but this does not interfere with the proper running or functioning of the various parts of the mechanism. Immediately upon the motor assuming the predetermined speed, the arch 8 will be sufficiently flattened that the push button may be released. In the illustrated form of mechanism, this speed will be attained in an inappreciable length of time.

The relation of the switch members and of the portion of the governor active upon these is so adjusted that upon a slowing down of the motor or the speed of the rotary element thereof below a predetermined minimum, either by an excessive load being thrown upon the driven part, as for instance in the illustration the rotary platen z, or by the stoppage of such driven part, the circuit will be instantly broken. In the construction above described the inward movement of the governor weights permits the wire 8 to arch and elevate the switch member 15.

The tractor wheel 5 is preferably given a certain amount of latitude in its bearings relative to the motor spindle 3.

Reference is made to a division of the present application filed October 31, 1919, Serial No. 334,800½, patented August 24, 1920, No. 1,350,571, which is directed to the combination with a phonograph or other electrically driven part and an electric motor for driving it of a centrifugal switch for opening or closing the circuit of said motor, irrespective of the specific construction of said switch. The present application is directed to the construction of a centrifugal switch adapted for use in such a combination.

Figure 2:
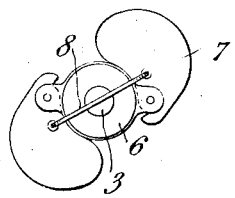
Fig. 2 is a top view of the governor mechanism shown in Fig. 1.

In Fig. 1 the casing is shown provided with a resilient non-slipping base 33. This may be a body of sponge rubber.

What I claim is:—

1. A centrifugal switch comprising a rotor, weights carried thereby pivoted on axes parallel to the axis of said rotor, and movable in a plane perpendicular to the axis of rotation, circuit-closing contacts and a spring for applying the movement of said weights, to operate said circuit contacts, in a direction along the axis of said rotor.

2. A switch comprising a centrifugal governor, and a circuit closer, said governor including weights, and an arched spring having its ends connected to said weights, whereby the span of said arched spring is governed by the position of said weights, and consequently the height of the arch, said circuit closer being actuated by the movements of said arched spring, said weights having pivoted axes parallel to the axis of rotation.

3. A switch comprising a centrifugal governor, and a circuit closer, said governor including weights, and an arched spring having its ends connected to said weights, whereby the span of said arched spring is governed by the position of said weights, and consequently the height of the arch, said circuit closer being actuated by the movements of said arched spring, said circuit closer comprising an arm and contact, said arm being so arranged with relation to said spring, that the flexure of the latter, due to decrease of speed of the motor actuating said governor, acts to move said arm away from said contact, and thereby break the circuit to said motor.

4. A switch comprising a contact arm, and a centrifugal and manual means for operating said switch arm to close the motor circuit, whereby said switch arm may be controlled by said manual means to move it to position to close said motor circuit independently of the speed of the motor.

5. A centrifugal switch, including a governor and circuit closer, the latter having a resilient connection with the former, and manually operable means actuating the circuit closer independently of the speed.

6. A centrifugal switch, including a governor and circuit closer, with a yielding connection between the governor and circuit closer, and a push button engaging the circuit closer for actuating it.

7. The combination with a rotary spindle, of a pair of weights pivoted to the said spindle and movable in a plane transverse to the axis of rotation thereof, an arched spring connecting the said weights, the arch being adapted to flatten upon the outward centrifugal movement of the weights, a circuit closer comprising a resilient contact member located in position to move with the arch as the weights move outward or inward, and a push button located in position to flatten the said arch and operate said circuit closer independently of the speed.

8. The combination with a rotary spindle, of a pair of weights pivoted to the said spindle and movable in a plane transverse to the axis of rotation thereof, an arch spring connecting the said weights, the arch being adapted to flatten upon the outward centrifugal movement of the weights, a circuit closer comprising a resilient contact member located in position to be moved to open position by the arch when the weights are at rest and to move to its closed position upon the flattening of the arch, and a push button located in position to flatten the said arch and close the circuit.

9. A governor, comprising a rotary spindle, a pair of weights pivoted to the said spindle and movable in a plane transverse to the axis of rotation thereof, an arch spring connecting the said weights, the arch being adapted to flatten upon the outward centrifugal movement of the weights, combined with a circuit closer actuated by said spring, and a push button, for operating said circuit closer, movable against said arch spring, to flatten it and throw the weights outwardly.

In witness whereof, I have hereunto signed my name in the presence of two subscribing witnesses.

WILLIAM GENTRY SHELTON.

Witnesses:
 MARY DANKER,
 WILLIAM M. GRAY.